United States Patent
Best et al.

(10) Patent No.: US 10,961,055 B2
(45) Date of Patent: Mar. 30, 2021

(54) COLLECTING ITEMS VIA A CHUTE IN A MATERIAL HANDLING ENVIRONMENT

(71) Applicant: INTELLIGRATED HEADQUARTERS, LLC, Mason, OH (US)

(72) Inventors: Richmond Emory Best, Frederick, MD (US); Greg Roth, Frederick, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/460,312

(22) Filed: Jul. 2, 2019

(65) Prior Publication Data

US 2021/0002076 A1 Jan. 7, 2021

(51) Int. Cl.
| | | |
|---|---|---|
| *B65G 47/44* | (2006.01) |
| *B65G 47/34* | (2006.01) |
| *B07B 4/06* | (2006.01) |
| *B65G 11/20* | (2006.01) |
| *B65G 11/02* | (2006.01) |

(52) U.S. Cl.
CPC .......... *B65G 11/203* (2013.01); *B65G 11/023* (2013.01); *B65G 47/44* (2013.01); *B65G 2811/098* (2013.01)

(58) Field of Classification Search
None
See application file for complete search history.

(56) References Cited

U.S. PATENT DOCUMENTS

| | | | | |
|---|---|---|---|---|
| 3,456,424 A | * | 7/1969 | Thurston | .................. B65B 5/12 53/154 |
| 3,464,573 A | * | 9/1969 | Riley | ................. F27D 99/0001 414/208 |
| 4,207,177 A | | 6/1980 | Block | |
| 4,712,962 A | * | 12/1987 | Johnston | ................ B65G 47/44 414/140.9 |
| 5,353,914 A | | 10/1994 | Stephen et al. | |

(Continued)

FOREIGN PATENT DOCUMENTS

| | | |
|---|---|---|
| CN | 106570976 B | 4/2017 |
| WO | 2016/179480 A1 | 11/2016 |

OTHER PUBLICATIONS

Extended European Search Report issued in European Application No. 20181781.4 dated Dec. 11, 2020, 8 pages.

*Primary Examiner* — Kavel Singh
(74) *Attorney, Agent, or Firm* — Alston & Bird LLP

(57) ABSTRACT

A material handling system includes a conveyor, an actuation unit, and a chute. The chute is mechanically coupled to the conveyor at a defined angle with respect to a surface of the conveyor. The chute includes an inlet defining a first end and a second end, where the first end of the inlet is mechanically coupled to the surface of the conveyor. Further, the chute includes at least one tube configured to be rotated by the actuation unit at a defined rotational speed. The chute also includes an outlet mechanically coupled to the at least one tube. In this aspect, the defined angle and the defined rotational speed is based on at least one of: physical characteristic of an item to be passed through the chute, a rate of inflow of the item through the inlet, and a rate of outflow of the item through the outlet.

20 Claims, 7 Drawing Sheets

(56) References Cited

U.S. PATENT DOCUMENTS

| | | | | |
|---|---|---|---|---|
| 6,250,472 B1 * | 6/2001 | Grubbs | ............... | B03B 9/061 |
| | | | | 198/629 |
| 7,380,651 B2 * | 6/2008 | Lafontaine | ............ | B65G 37/02 |
| | | | | 193/25 FT |
| 8,640,847 B2 * | 2/2014 | Nishitsuji | ............... | B65B 9/20 |
| | | | | 193/2 R |
| 2004/0084468 A1 | 5/2004 | Kelbert et al. | | |

\* cited by examiner

COLLECTING ITEMS VIA A CHUTE IN A MATERIAL HANDLING ENVIRONMENT

TECHNOLOGICAL FIELD

Example embodiments described herein relate generally to a material handling system, and, more particularly, to collecting items via a chute in a material handling environment.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds. Typically, in the material handling environments, items are conveyed on conveyors and are often collected into one or more chutes that are positioned alongside conveyors of the material handling system. Depending on a configuration of the material handling system, the items may travel through the material handling environment in an unregulated manner or may be repositioned, reoriented, and/or consolidated into a single stream of items as the items move on the conveyors and/or further collected into the chutes. For example, in some cases, items are sorted by sortation conveyor of the material handling system and upon sortation are collected into respective chutes.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to a material handling system that can comprise a conveyor, an actuation unit, and a chute. The chute can be mechanically coupled to the conveyor at a defined angle with respect to a surface of the conveyor. The chute can comprise an inlet defining a first end and a second end, where the first end of the inlet can be mechanically coupled to the surface of the conveyor. Further, the chute can comprise at least one tube. The at least one tube defines a proximal end and a distal end. In this regard, the proximal end of the at least one tube can be mechanically coupled to the second end of the inlet. Further in accordance with said example embodiments, the at least one tube is configured to be rotated about an axis by the actuation unit at a defined rotational speed. The chute further comprises, an outlet that can be mechanically coupled to the distal end of the at least one tube. In accordance with said example embodiments, the defined angle at which the chute can be mechanically coupled to the conveyor and the defined rotational speed at which the at least one tube can be configured to rotate are based on at least one of: physical characteristic of an item to be passed through the chute, a rate of inflow of the item through the inlet, and a rate of outflow of the item through the outlet. In some examples, the physical characteristic of the item is associated with at least one of: a size of the item, a dimension of the item, a weight of the item, a material of the item, and a type associated with the item.

According to some example embodiments, the actuation unit can comprise, at least one drive roller and at least one idler roller. In this regard, the at least one drive roller and the at least one idler roller can be configured to rotate in a first direction cause rotation of the at least one tube in a second direction opposite to the first direction.

According to some example embodiments, the at least one tube can be positioned between the at least one drive roller and the at least one idler roller. Further, the at least one tube can abut with a surface of the at least one idler roller and a surface of the at least one drive roller respectively so that the rotation of the drive roller and the idler roller causes rotation of the at least one tube.

In some example embodiments, the at least one tube can be configured to rotate at a variable rotational speed within a defined range of rotational speed.

According to some example embodiments, the conveyor is one of: a loop sorter, a tilt-tray sorter, a bomb-bay sorter, a shoe sorter, a singulation conveyor, or a line sorter.

In some example embodiments, the actuation unit can include a shaft assembly mechanically coupled to the at least one drive roller and at least one idler roller. In this regard, the rotation of the at least one drive roller and the at least one idler roller the shaft assembly to rotate a tube corresponding to each chute of the plurality of chutes.

According to some example embodiments, the material handling system can further comprise a control unit. The control unit can be configured to determine, at least one of: the physical characteristic of the item to be passed through the chute, the rate of inflow of the item through the inlet, and the rate of outflow of the item through the outlet. Further, based on the determining, the control unit can be configured to manipulate, via the actuation unit, the rotational speed of the at least one tube.

Some example embodiments described herein relates to a chute of a material handling system. The chute comprises, an inlet of the chute configured to interface with a surface of a conveyor at a defined angle with respect to the surface. The chute also comprises an outlet of the chute configured to interface with an item accumulator. Further, the chute comprises, a tube portion of the chute between the inlet and the outlet. In accordance with said example embodiments, the tube portion can be configured to be rotated about an axis at a defined rotational speed by an actuation motor. In this regard, the defined angle at which the inlet is configured to interface with the surface of the conveyor and the defined rotational speed at which the tube portion is configured to be rotated are based on at least one of: physical characteristic of an item to be passed through the chute, a rate of inflow of the item through the inlet, and a rate of outflow of the item through the outlet.

In accordance with some example embodiments, the tube portion can be configured to be rotated at variable rotational speed within a defined range of rotational speed. Further, in some example embodiments, the rotational speed of the tube portion can be based on at least: a physical characteristic of the item, a rate of inflow of the item through the inlet, and a rate of outflow of the item through the outlet.

According to some example embodiments, the inlet comprises, a first end that can define a tapered surface and can be mechanically coupled to the conveyor. In this regard, the first end can be configured to receive a flow of items from the conveyor. In accordance with said example embodiments, the inlet also comprises a second end having a curved surface that defines a curvature that matches a lateral surface defining a proximal end of the tube portion to facilitate movement of flow of the items from the inlet to the tube portion.

According to said example embodiments, the outlet comprises a first portion defining a curved surface defining a curvature that matches a lateral surface defining a distal end of the tube portion to facilitate the movement of the flow of the item from the tube portion to the outlet.

In some example embodiments, the inlet of the chute is mechanically coupled to one of: a loop sorter, a tilt-tray sorter, a bomb-bay sorter, a shoe sorter, a singulation conveyor, or a line sorter.

Some example embodiments described herein relates to a method of collecting items in a material handling environment. The method comprises, receiving, via an inlet of a chute, an item from a conveyor. In this regard, the inlet of the chute is positioned at a defined angle with respect to the conveyor. Further, the method comprises, receiving, via a tube defined at a portion of the chute, the item from the inlet. In this aspect, the tube defines a first end mechanically coupled to the inlet and a second end. Further, the method comprises, rotating, the tube at a defined rotational speed, to cause a further movement of the item into an outlet mechanically coupled to the second end of the tube. According to said example embodiments, the defined angle of the inlet and the defined rotational speed at which the tube is to be rotated can be based on at least one of: physical characteristic of the item, a rate of inflow of the item through the inlet, and a rate of outflow of the item through the outlet.

According to some example embodiments, the chute can be positioned at a defined angle relative to the conveyor. In this aspect, in some examples, the conveyor is one of: a loop sorter, a tilt-tray sorter, a bomb-bay sorter, a shoe sorter, a singulation conveyor, or a line sorter.

In some example embodiments, the method can comprise, rotating a drive roller and an idler roller, at a defined rotational speed in a first direction to cause rotation of the tube in a second direction opposite to the first direction.

According to some example embodiments, the method can further comprise, manipulating a rotational speed of the rotating of the tube based on at least one of: physical characteristic of the item, a rate of inflow of the item through the inlet, and a rate of outflow of the item through the outlet.

According to some example embodiments, the chute is mechanically coupled to the conveyor and wherein the conveyor is one of a loop sorter (tilt-tray or cross-belt), a bomb-bay sorter, a shoe sorter, a singulation conveyor, or a line sorter.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
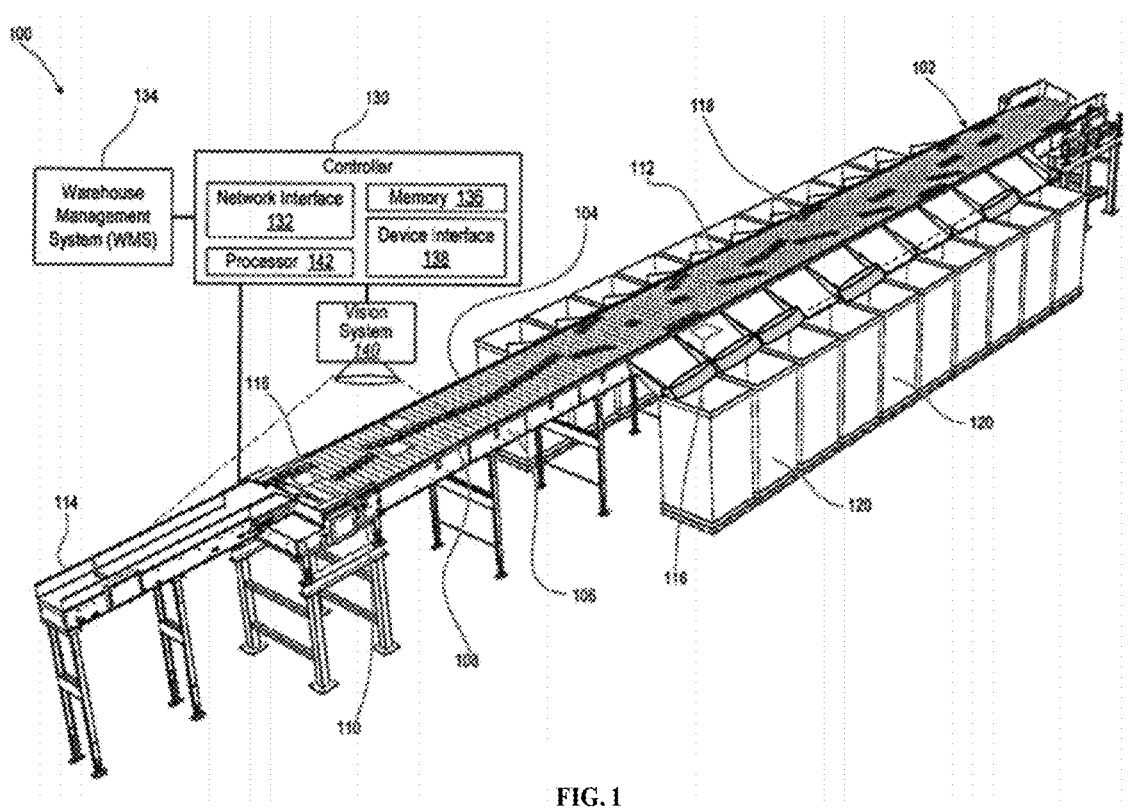
FIG. 1 illustrates a perspective view of a material handling system comprising a plurality of chutes, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Typically, in material handling systems, chutes are installed alongside a conveyor at various positions to collect items into item accumulators and/or to transfer items to another conveyance equipment (e.g. secondary conveyors extending from a primary upstream or downstream conveyor). In this regard, as some items are diverted from a mail or flow of items flowing on the conveyor, the items flow through respective chutes identified for the items (e.g. based on item category, size etc.), and are further accumulated into item accumulators. For example, a flow of items on the conveyor may contain different types of items having varying shapes and sizes, moving on the conveyor. As these items flow on the conveyor, in some examples, depending on shape, size or category of the item, the items may be diverted (e.g. by a sortation system like a loop sorter, shoe sorter, etc.) onto different chutes positioned alongside the conveyor. Chutes are generally in a form of a slide onto which an item can fall based on gravitational and centrifugal forces experienced by the item, as the item is diverted from the conveyor towards the chute. Usually, the chutes can be positioned at an angle relative to a surface of the conveyor such that, a slope defined by the chute is sufficient enough to cause falling of an item through the chute into an item accumulator and/or to transfer items to another conveyance equipment (e.g. secondary conveyors extending from a primary upstream or downstream conveyor). Said differently, an angle at which the chute is installed against a surface of the conveyor (or relative to a ground surface) can be such that, it causes the item to experience a gravitational pull downwards towards the ground surface that overcomes a static friction force experienced by the item due to the surface of the chute. However, as items of various shapes and sizes flow on the conveyor in form of a bulk flow, it is desired, to give careful consideration while positioning or installing chutes alongside conveyor frames of the conveyor. For instance, a greater angle at which the chute may be installed with respect to the conveyor surface may often cause an increase in rate of flow/speed at which items may fall onto the chute. This may cause larger items to impact against smaller items, in the flow of items, resulting in damaging of items, or excessive noise, or sometimes personal injury to operators working in the material handling system. Alternatively, a smaller angle at which the chute may be installed relative to the conveyor surface may cause a decreased rate of flow or slow speed at which the items move onto the chute, thereby creating jams, and at times requiring manual intervention by an operator to clear the jams. Further, this jamming and manual intervention may lead to excessive downtime and system recirculation. Accordingly, installing chutes alongside conveyors in a material handling environment has associated challenges and limitations.

Various example embodiments described herein, relates to a chute of a material handling system comprising, a tube which can be configured to rotate at a desired rotational speed to maintain a constant flow rate of items, as the items pass through the chute. The chute can comprise, (i) an inlet, (ii) at least a portion defining a tube that can be configured to be rotated at a desired rotational speed, and (iii) an outlet. In this regard, the inlet is mechanically coupled to a first end of the tube and the outlet is mechanically coupled to the second end of the tube. Further, the inlet can be mechanically coupled to a surface of a conveyor at a defined angle and the outlet can be mechanically coupled to an item accumulator (which may collect items that may fall through the chute). As mentioned, the inlet of the chute is positioned at a defined angle relative to the surface of the conveyor. In this regard, in accordance with various example embodiments described herein, (a) the defined angle at which the chute is positioned relative to the conveyor and (b) the desired rotational speed at which the tube can rotate, can be based on factors like physical characteristic of items to be passed through the chute, a rate of inflow of items through the inlet, and a rate of outflow of items through the outlet. In this aspect, irrespective of varying sizes and shapes of the items, by way of implementation of various example embodiments described herein, the chute based on rotation can maintains a constant flow rate at which the items pass through the chute, thereby can prevent any jamming or falling of items at an excessively faster rate that may cause damage to the items.

Further, the chute described according to various example embodiments herein, can handle a wider spectrum of items (i.e. items having varying sizes, shapes, weights, etc.) in the same volume without any limitations (like, product speed, damage, product jams, etc.). In other words, as the chute continually feeds the items forward at a controlled rate, items may progress toward the chute outlet with a reduced risk of getting stuck or travelling excessively fast. Furthermore, a descent of items through the chute can be controlled while maintaining continuous infeed of items through the chute. In this regard, in accordance with said example embodiments, larger/heavier items may move thought the chute at substantially similar rates as smaller lighter items. Further details of the material handling system comprising the chute and its associated operations are described hereinafter in reference to FIGS. 1-5.

"A flow of items" referred hereinafter throughout the description, refers to a set of items that can comprise at least one item, that may move along a surface of a conveyor or a chute, at a defined flow rate (e.g. items per second). In this regard, in some example embodiments, each item in the flow of items may move along the conveyor or the chute at same or varying speed relative to each other.

FIG. 1 illustrates a perspective view of a material handling system 100 comprising a sortation conveyor (referred hereinafter, as a conveyor 102) and a plurality of chutes 150, in accordance with various example embodiments described herein. For purpose of brevity, the material handling system 100 illustrated herein represents, an example material handling environment (e.g. but not limited to, a warehouse, a distribution center, an inventory, etc.) in which a chute described according to various example embodiments herein, may be installed. Illustratively, the material handling system 100 includes the conveyor 102 that can comprise a pair of left and right lateral side conveyor frames 104, 106, and an apron 108 of lateral slats 110. The lateral slats 110 can be supported for longitudinal movement on the conveyor 102 to define a top conveying run 112 and a bottom return run (not shown).

Illustratively, the material handling system 100 also includes an induction conveyor 114 that can be positioned to deposit a plurality of items 116 onto the top conveying run 112. As a flow of the plurality of items 116 moves on the top conveying run 112 of the conveyor 102, some items from amongst the plurality of items 116 may be diverted and deposited onto one or more of the plurality of chutes 150 positioned along the left and right lateral side conveyor frames 104, 106. Furthermore, the items may be moved via the chutes 150, into respective item accumulators 120 corresponding to the plurality of chutes 150 and/or can be transferred to another conveyance equipment (e.g. secondary conveyors extending from a primary upstream or downstream conveyor). According to said example embodiments, the induction conveyor 114 can be an offset induct belt that allows use of a single pusher on each flight that runs down towards center of the conveyor 102 and allows diverting of one or more items 116 off, both sides of the conveyor 102, and further into the respective chutes 150. In this regard, in some example embodiments, the chutes 150 may positioned on both left and right side of the conveyor 102. As illustrated, the conveyor 102 can comprise more than one pusher (or shoe) 118 received for lateral movement across the apron 108, and transverse to the longitudinal movement of the conveyor 102. In this regard, each pusher 118 may be configured to cause diverting of the items from the conveyor 102 into respective chutes 150.

Illustratively, the material handling system 100 also comprises, a controller referred hereinafter as, a control unit 130, of the conveyor 102. The control unit 130 can comprise a network interface 132 that can be configured to communicate with a warehouse management system (WMS) 134. Further, the control unit 130 can also include a memory 136 containing parameters and other configuration settings. For example, the control unit 130 may access via the memory 136, parameters and settings to identify one or more of: items or chutes selected from amongst the plurality of chutes 150 onto which one or more items from the flow of items 116 is to be diverted. In some example embodiments, the control unit 130 can include a device interface 138 that may control electrical communication with the conveyor 102 and an item scanner or vision system 140.

In accordance with some example embodiments, a processor subsystem 142 of the control unit 130 can be in communication with the network interface 132, the memory 136, and the device interface 138. In this regard, in some example embodiments, the processor subsystem 142 may receive a scanned identification from the item scanner or the vision system 140 of a flow of items 116. Further, the processor subsystem 142 may receive, from WMS 134, for each item from amongst the flow of items 116, an identification of a chute 150 into which the item is to be diverted. Furthermore, based on the received identification, the processor subsystem 142 may assign one or more pushers 118 predicted to flank a selected item from amongst the flow of items 116 towards one of a chute (i.e. a selected chute from amongst the plurality of the chutes 150). Accordingly, one or more items from amongst the flow of items 116 can be diverted into respective chutes 150 at a defined flow rate. In accordance with said example embodiments, the chutes 150 of the material handling system 100 are rotatable about its axis. In this regard, the chutes 150 can be configured to rotate at a desired rotational speed so as to facilitate a desired flow of items into item accumulators 120 respective to each chute and/or to another conveyance equipment, while at the same time, prevent jamming of items (which may occur during transition of items from the conveyor 102 onto a chute or item accumulator) or damaging of the items (which may occur due to high rate of falling of items onto the chute from the conveyor 102). Details related to chutes 150 of the material handling system 100 and method of collecting items, are described hereinafter in reference to FIGS. 2-5.

It should be appreciated that, in some example embodiments, the control unit 130, the processor subsystem 142, and/or the WMS 134 may include circuitry that may comprise a separate processor, specially configured field programmable gate array (FPGA), or application specific interface circuit (ASIC) to perform various operations described herein.

Although, FIG. 1 illustrates an example of a sortation conveyor system, e.g. an in-line shoe sorter comprising the conveyor 102 against which the chutes 150 described in accordance with various example embodiments herein, can be installed. However, without limiting the scope of the present disclosure, the chutes 150, 200 described hereinafter in accordance with various example embodiments can be installed against conveyors of various other types of sortation systems (e.g. but not limited to, a loop sorter (tilt-tray or cross-belt), a bomb-bay sorter, a shoe sorter, a singulation conveyor, and a line sorter. For example, in some example embodiments, the chutes 150 can be installed against sortation conveyor (representing a loop sorter) as described in U.S. Non-Provisional patent application Ser. No. 16/105, 667, entitled, "Cart Coupling Assembly," filed on Aug. 20, 2018, details of which is hereby incorporated by reference in its entirety.

Figure 2:
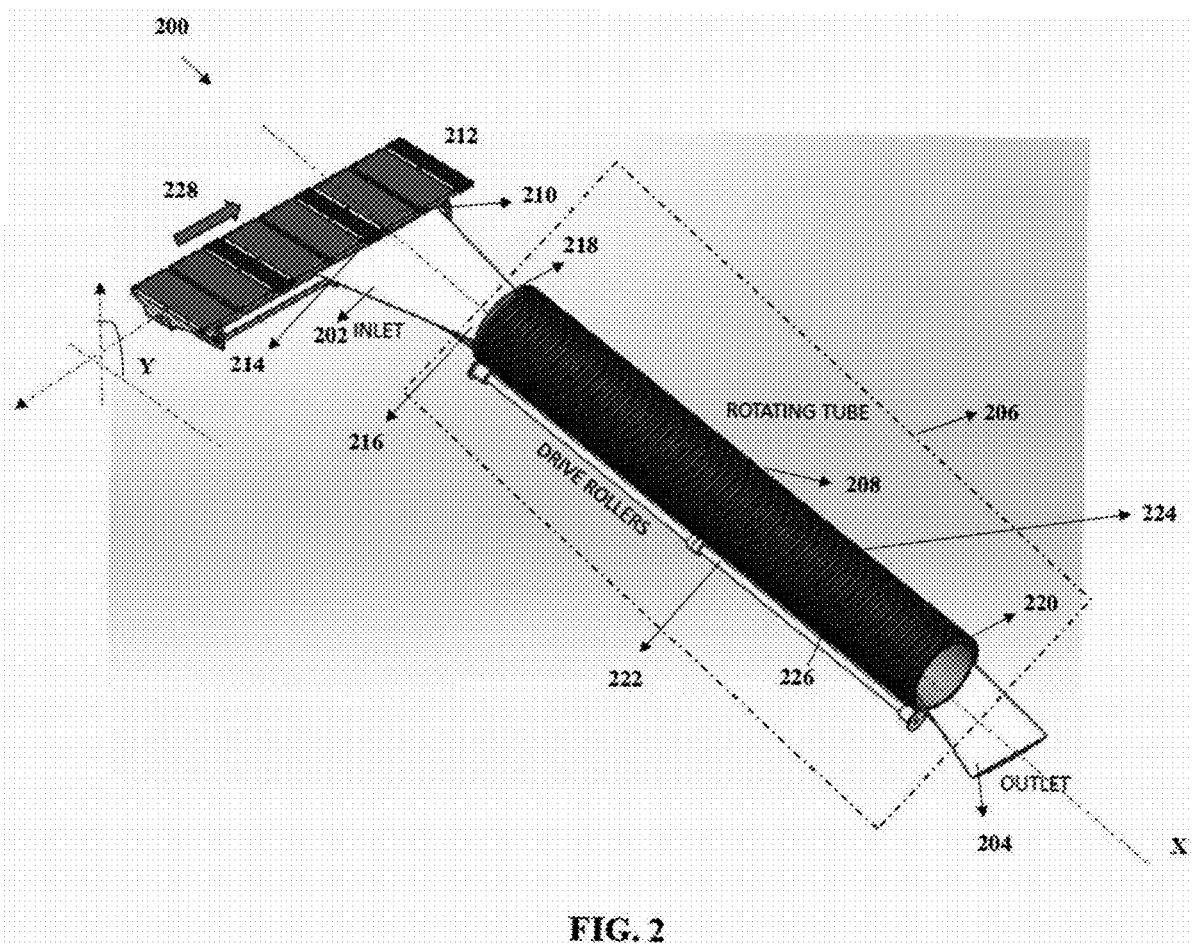
FIG. 2 illustrates a perspective view of a chute of the material handling system, in accordance with some example embodiments described herein.

FIG. 2 illustrates a perspective view of a chute 200 of the material handling system 100 in accordance with various example embodiments described herein. The chute 200 illustrated herein may represent one or more of the plurality of chutes 150 illustrated in FIG. 1. Referring to FIG. 2, the chute 200 comprises, an inlet 202, an outlet 204, and a tube portion 206 defined between the inlet 202 and the outlet 204. In this regard, the tube portion 206 defines a tube 208. In this regard, in accordance with said example embodiments, the tube 208 can be configured to be rotated about an axis X. Although, in the illustrated FIG. 2, the tube portion 206 comprises one tube, i.e. the tube 208, however, without limiting the scope of the present disclosure, in alternate example embodiments, the tube portion 206 may define one or more than one similar tubes (i.e. the tube 208) between the inlet 202 and the outlet 204, where each of the tube can be configured to be rotated about its respective axis (e.g. axis X). Said differently, according to some example embodiments, there may be one or more than one such rotatable tubes, (i.e. the tube 208) defined between the inlet 202 and the outlet 204 of the chute 200 each of which may be configured to be rotated at same or different rotational speeds. In some examples, the tube 208 may correspond to a corrugated style plastic drainage tube. In alternate example embodiments, the tube 208 may be made up of a same material as of the inlet 202 and outlet 204 of the chute 200.

Illustratively, the inlet 202 is interfaced with a surface 210 of a conveyor 212, at a defined angle Y. In some examples, the chute 200 may be positioned such that the inlet 202 is positioned at the defined angle Y with respect to the surface 210 of the conveyor 208, thereby defining a slope, (in other words, in form of a slide) from the conveyor 212 and onto which items moving the conveyor 212 may fall through, as the items get diverted onto respective chutes. In another aspect, the chute 200 may be positioned at a defined angle relative to a ground surface.

According to said example embodiments, the inlet 202 can define a first end 214 and a second end 216. The first end 214 of the inlet 202 can be mechanically coupled (for example, but not limited to, connected or in connection, by means such as, fastening unit, screws, bolt or nut arrangement, and/or, the like) to the surface 210 of the conveyor 212. In this regard, the mechanical connection between the inlet 202 and the surface 210 of the conveyor 212 may be such that, it may not cause any obstruction or hindrance to the flow of items which may fall into item accumulators, through the chute 200, from the conveyor 212. Illustratively, the tube 208 defines a proximal end 218 and a distal end 220. The proximal end 218 of tube 208 can be mechanically coupled to the second end 216 of the inlet 202. Further, the distal end 220 of the tube 208 can be mechanically coupled to the outlet 204, which can be further mechanically coupled to an item accumulator that collects items. In some examples, the outlet 204 can be mechanically coupled to another conveyance equipment (e.g. secondary conveyors extending from a primary upstream or downstream conveyor).

In accordance with said example embodiments, the tube 208 can be rotated about the axis X by an actuation unit that may cause rotation of the tube 208. For instance, in some example embodiments, the actuation unit can comprise a drive roller 222 and an idler roller 224 that can be configured to rotate about its respective axis, on actuation by the actuation unit (e.g. by a motor of the actuation unit). Illustratively, the tube 208 is positioned between the drive roller 222 and the idler roller 224 such that, a lateral surface 226 of the tube 208 abuts with surfaces of the drive roller 222 and the idler roller 224, respectively. In this regard, an arrangement of the drive roller 22 and the idler roller 224 with respect to the tube 208 is such that, rotation of the drive roller 222 and the idler roller 224 in a first direction causes rotation of the tube 208 in a second direction opposite to the first direction. Said differently, if the drive roller 222 and the idler roller 224 rotates in a clockwise direction about X axis, the tube 208 rotates in a counterclockwise direction about X axis.

In accordance with said example embodiments, the conveyor 212 may correspond to the conveyor 102 illustrated in FIG. 1 that may support flow of items in a direction 228. Thus, as the items flow on the surface 210 of the conveyor 212 and are diverted towards the chutes, as the inlet 202 of the chute 200 is positioned at an angle relative to the conveyor 212 (i.e. at a defined slope) some items, from the flow of items, which are diverted towards the chute 200 falls onto the inlet 202 of the chute 200. In this regard, in some example embodiments, the angle Y at which the chute 200 is mechanically coupled to the conveyor 102 can be such that, it allows the items to fall onto the inlet 202 due to gravitational pull that may be experienced by the items. Said differently, the angle Y is enough that every item falling through the chute 200 can overcome a static component of sliding friction experienced by the item as it falls through a surface of the inlet 202. In this regard, the angle Y at which the chute 200 is positioned relative to the conveyor 212 may be defined depending on various factors such as, but not limited to, at least one of: physical characteristic of items to be passed through the chute 200, a rate of inflow of items through the conveyor 212, a desired rate of flow of items through inlet 202, and a desired rate of outflow of items through the outlet 204. In some examples, the angle at which the chute 200 can be positioned relative to the ground surface can be within a range from about 10 degrees to about 30 degrees. However, in some example embodiments, the angle may not be consistent across the entire length of the chute 200 and can depend on the type of application desired.

Figure 3:
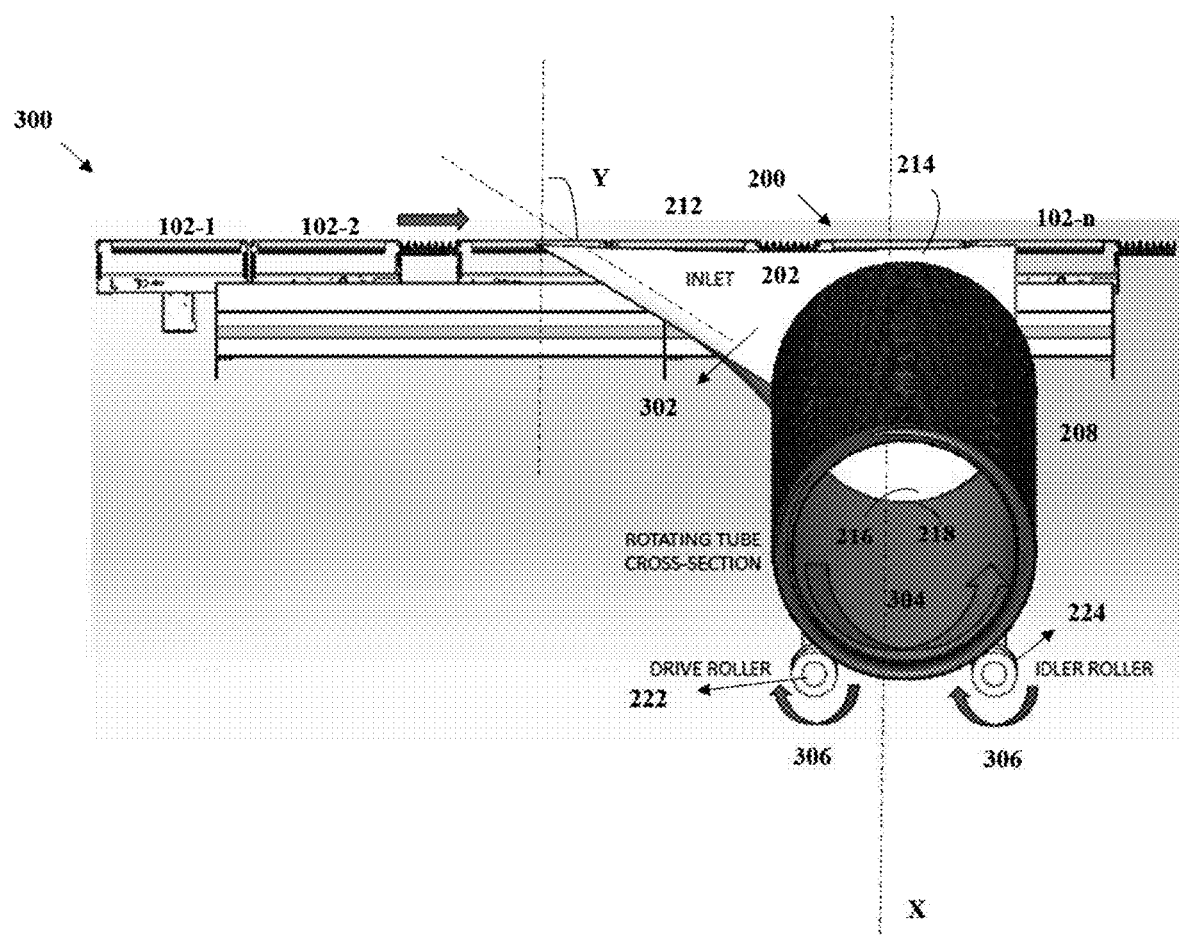
FIG. 3 illustrates an end view of the chute of the material handling system, in accordance with some example embodiments described herein.

FIG. 3 illustrates an end view 300 of the chute 200 of the material handling system 100, in accordance with some example embodiments described herein. As illustrated, the chute 200 is mechanically coupled to the conveyor 102 comprising one or more chute interfacing units (102-1, 102-2, 102-3 . . . 102-n) e.g. cross-belts of a cross-belt sorter or slats of a slat-shoe sorter as illustrated in FIG. 1, along which the pusher 118 may move across a width of the conveyor (102, 212). In accordance with various example embodiments described herein, the chute 200 can be mechanically coupled, via the chute interfacing units (102-1, 102-2, 102-3, . . . 102-n) to any type of conveyor or sortation system, and/or a surface corresponding, but not limited to, one or more of: a loop sorter (tilt-tray or cross-belt), a bomb-bay sorter, a shoe sorter, a singulation conveyor, and a line sorter.

As shown, the inlet 202 of the chute 200 from its first end 214 is mechanically coupled to the conveyor 102. In this regard, in accordance with some example embodiments, the inlet 202 towards its first end 214 may define a tapered surface that mechanically couples with the surface 210 of the conveyor 212. The tapered surface towards the first end 214 of the inlet defines a smooth transition from the surface 210 of the conveyor 212 to a surface of the inlet 202 which prevents any bumping off the items, as the items flowing on the conveyor 212 are diverted and transitioned into the chute 200. Further, according to said example embodiments, the inlet 202, between its first end 214 and the second end 216, defines a sloping surface, in form of a slide, that enables a smooth sliding down of the items, at a desired flow rate, as the items flow from the conveyor 212 in the chute 200. In this aspect, in accordance with said example embodiments, the inlet 202 is positioned at the angle Y relative to the surface 210 of the conveyor 102, 212 such that, in operation, a gravitational pull acting on each item that drives the item down in the chute 200 overcomes a frictional force experienced at each item by a surface 302 of the inlet 202.

Further, according to said example embodiments, the second end 216 of the inlet 202 defines a shape having a curvature that matches with a lateral surface defining the proximal end 218 of the tube 208. Thus, the shape of the second end 216 of the inlet 202 and of the proximal end 218 of the tube are so matched such that, as the items falls through the inlet 202, the items make a smoother transition from the second end 216 of the inlet 202, via the proximal end 218 into the tube 208 in rotation. In some example embodiments, the tube may rotate in a direction 304 about the axis X. According to some example embodiments, rotation of the tube 208 about the axis X may be by the actuation unit comprising the drive roller 222 and the idler roller 224. As shown, the tube 208 is disposed between the drive roller 222 and the idler roller 224. In said example embodiments, the drive roller 222 and the idler roller 224 may be mechanically coupled to a shaft of an electric motor that upon actuation may cause rotation of the drive roller 222 and the idler roller 224 in direction 306. In this regard, according to said example embodiments, the idler roller 224 may support the rotation of the drive roller 222 in the direction 306 opposite to the direction 304 of rotation of the tube 208.

In some example embodiments, there may be multiple pairs of drive rollers and idler rollers respective for each chute from amongst multiple chutes in the material handling system 100. In this regard, the actuation unit can comprise a shaft assembly mechanically coupled a drive roller and an idler roller respective to each chute, from amongst plurality of chutes (e.g. chutes 150) along the conveyor 102, 212. To this extent, the rotation of the at drive roller and the idler roller corresponding to each chute is by actuation of the shaft assembly which causes rotation of a shaft connecting each of the idler roller and the drive roller arrangement for each chute. Details related to material handling system 100 comprising multiple chutes and multiple pairs of drive rollers and idler rollers are described later in reference to FIGS. 5 and 6.

Figure 4:
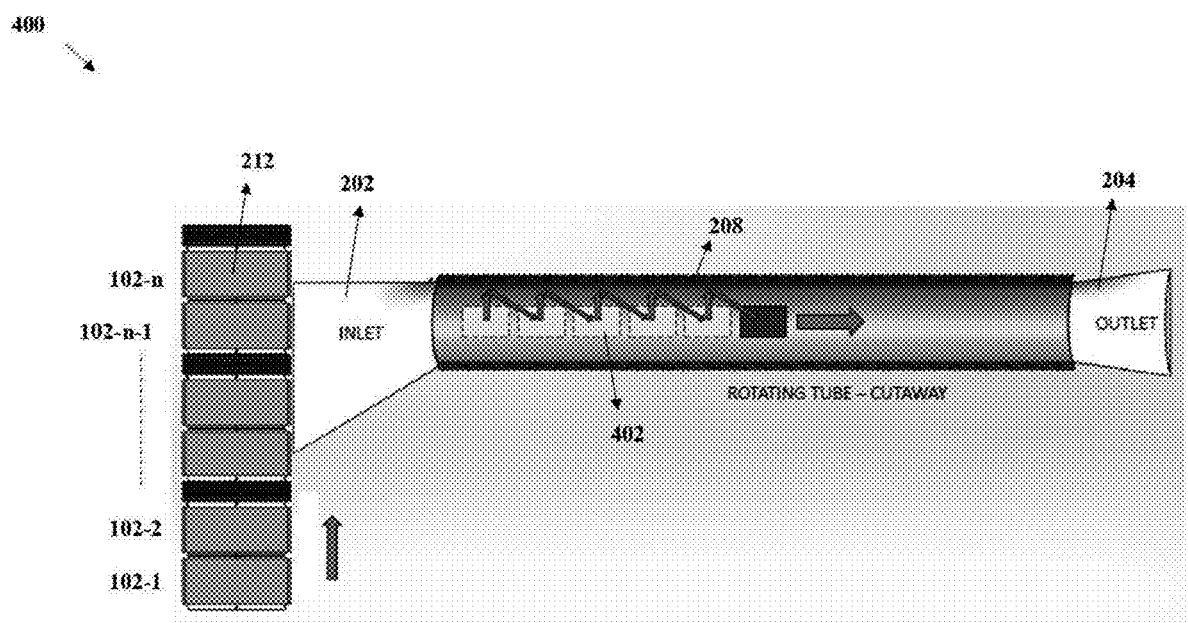
FIG. 4 illustrates a top view of the chute of the material handling system and a flow of items through the chute, in accordance with some example embodiments described herein.

FIG. 4 illustrates a top view 400 of the chute 200 of the material handling system 100 and a flow of items 402 through the chute 200, in accordance with some example embodiments described herein. As illustrated, a flow of items 402 can pass through the tube 208 of the chute 200. In this regard, the flow of items 402 may represent, a set of items, from amongst the flow of items 116 illustrated in FIG. 1, which are being diverted towards the chute 200. In accordance with some example embodiments, the flow of items 402 may represent items having common characteristics such as, but not limited to, item type, product category, item size, item handling property (fragile, consumable goods etc.), recipient container identifier, and/or the like. In this regard, the set of items 402 to be diverted towards the chute 200 may be identified based on similar characteristics associated with the items. According to said example embodiments, the flow of items 402 may move into the tube 208 at a defined flow rate (e.g. 20 items per minute, 50 items per minute, and/or the like). Further, the tube 208 can be rotated at a defined rotational speed to maintain a desired flow rate at which the flow of items 402 exits the tube 208. In this regard, in some example embodiments, the rotational speed at which the tube 208 can be rotated may be within a range from about 30 revolutions per minute to about 120 revolutions per minute, or more specifically within a range from about 40 revolutions per minute to about 100 revolutions per minute. In some examples, the rotational speed at which the chute 200 can be rotated can be controlled by a variable frequency drive (VFD) coupled to the control unit 130. In this regard, the rotational speed at which the chute 200 rotates can be configured depending of factors like, but not limited to, type of items being sorted by the conveyor 212, a speed or frequency at which the items are being diverted by the conveyor 212, the angle Y at which the chute 200 is installed relative to the conveyor 212, and a desired overall handling of the items. In some example embodiments, the tube 208 can be rotated at a rotational speed that can ensure: (i) maintaining the desired rate of flow of the items 402 through the tube 208 and (ii) preventing any jamming of items as the items pass through the tube 208. In some example embodiments, the tube 208 can be rotated at a rotational speed that maintains the desired rate of flow of the items 402 through the tube 208. In this aspect, the rotational speed of the tube 208 may be based on factors like, but not limited to, physical characteristic of the items (e.g., but not limited to, size of items, dimensions of the items, weight of the items, material of the items, and a type associated with the items) or a rate of inflow of the items 402 onto the inlet 202 or a desired rate of outflow of the items 402 onto the outlet 204. In some example embodiments, the rotational speed of the tube 208 may be varied within a defined range to ensure the flow of items 402 at the desired flow rate.

In some example embodiments, the control unit 130 of the material handling system 100 may determine, various parameters, for example, at least one of: the physical characteristic of items 402 to be passed through the chute 200, the rate of inflow of items through the inlet 202, and the rate of outflow of items through the outlet 204. Based on the parameters the control unit 130 may cause to manipulate, via the actuation unit, the rotational speed of the tube 208. In this regard, the control unit 130, may cause to increase or decrease a rotational speed of the tube 208 to maintain a constant flow rate of the items.

Figure 5:
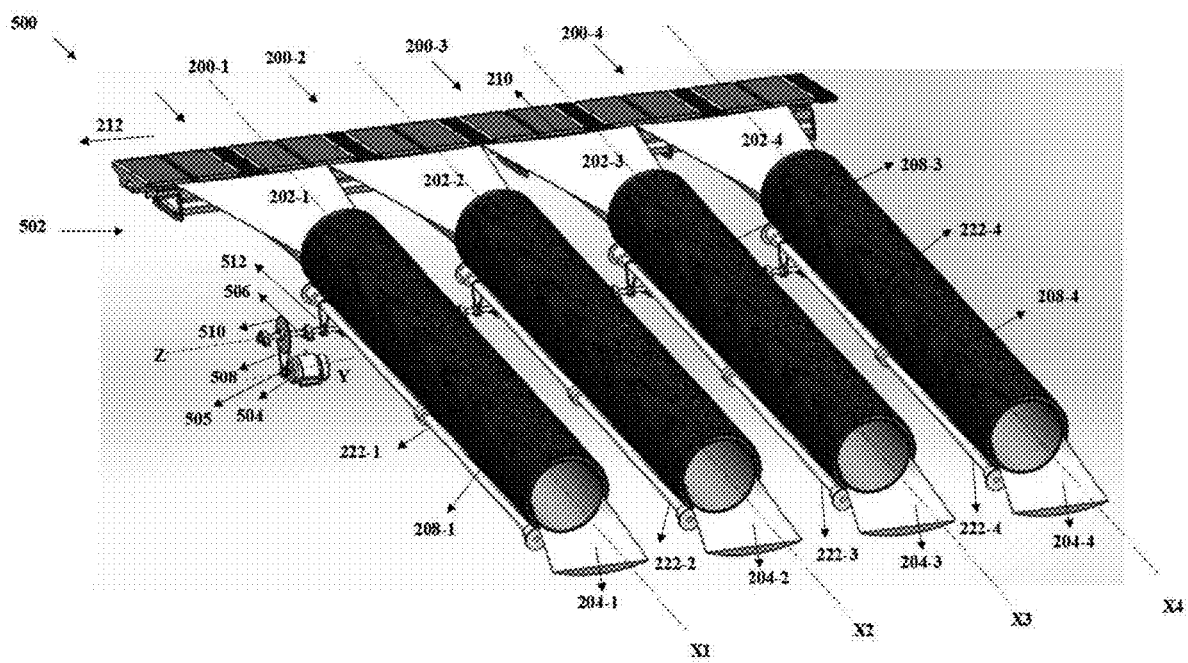
FIG. 5 illustrates a top perspective view of a material handling system comprising a plurality of chutes, in accordance with some example embodiments described herein.
Figure 6:
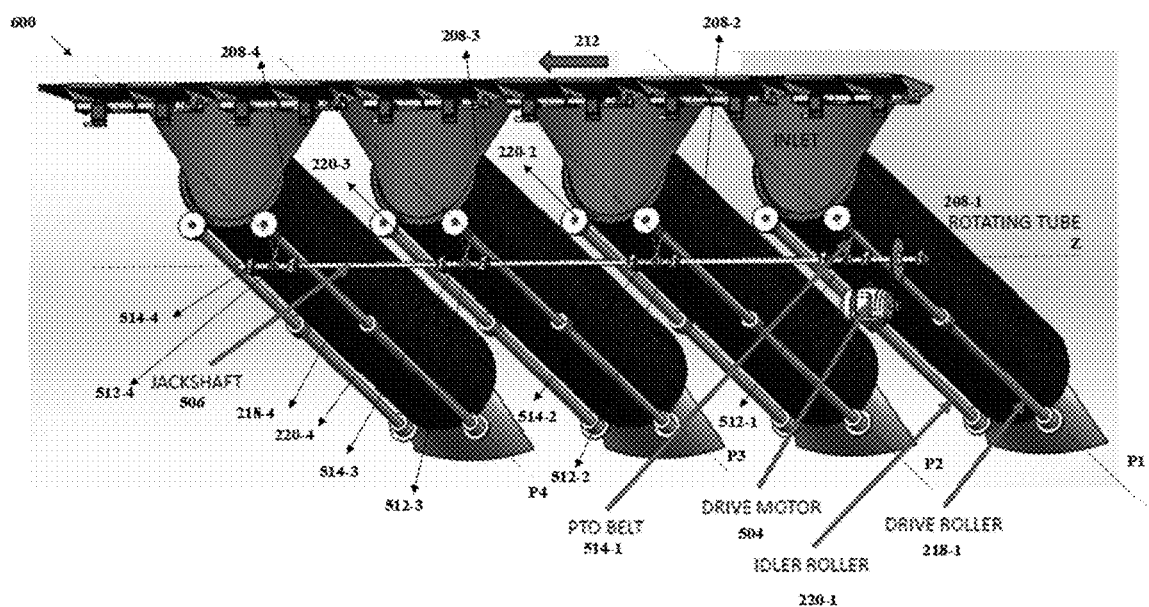
FIG. 6 illustrates a bottom perspective view of the material handling system comprising the plurality of chutes, in accordance with some example embodiments described herein.

FIG. 5 illustrates a top perspective view 500 of a material handling system 502 comprising a plurality of chutes (200-1, 200-2, 200-3, and 200-4), in accordance with some example embodiments described herein. FIG. 6 illustrates a bottom perspective view 600 of the material handling system 502 comprising the plurality of chutes (200-1, 200-2, 200-3, and 200-4), in accordance with some example embodiments described herein. As illustrated, each chute from amongst the plurality of chutes (200-1, 200-2, 200-3, and 200-4) comprises inlets (202-1, 202-2, 202-3, and 202-4), outlets (204-1, 204-2, 204-3, and 204-4), and tubes (208-1, 208-2, 208-3, and 208-4) respectively. In this regard, each tube from amongst the tubes (208-1, 208-2, 208-3, and 208-4) can be configured to be rotated about a respective axis X1, X2, X3, and, X4. Rotation of the tubes (208-1, 208-2, 208-3, and 208-4) can be caused by an actuation unit comprising, a drive motor 504, a jackshaft 506, a driving belt 508, a drive wheel 510, and multiple gear units (512-1, 512-2, 512-3, and 512-4). As shown, the drive motor 504 is mechanically coupled to a jackshaft 506, via a driving belt 508 that is pulleyed over a drive wheel 510 connected to the jackshaft 506. The actuation unit further comprises drive rollers and idler rollers arrangement comprising pairs of drive rollers (218-1, 218-2, 218-3, and 218-4) and idler rollers (220-1, 220-2, 220-3, and 220-4). In this regard, each of the tubes (208-1, 208-2, 208-3, 208-4) is positioned respectively between each pair of the drive roller and the idler roller (218-1, 220-1), (218-2, 220-2), (218-3, 220-3), and (218-4, 220-4) such that, rotation of the drive rollers (218-1, 218-2, 218-3, and 218-4) and idler rollers (220-1, 220-2, 220-3, and 220-4) in a first direction causes the respective tubes (208-1, 208-2, 208-3, and 208-4) to rotate about its axis in a second direction opposite to the first direction.

In accordance with said example embodiments, the drive motor 504 upon initialization (e.g. by the control unit 130) can cause a shaft 505 of the drive motor 504 to rotate about an axis Y, which can further cause movement of the driving belt 508 (disposed over the shaft 505) about the drive wheel 510. Movement of the driving belt 508 over the drive wheel 510 causes the drive wheel 510 to rotate about its axis Z. As shown, the jackshaft 506 through passes from the drive wheel 510. Thus, the rotation of the drive wheel 510 about the axis Z, can cause the jackshaft 506 to follow rotation of the drive wheel 510. Referring to FIG. 6, each drive roller (218-1, 218-2, 218-3, and 218-4) is mechanically coupled to the jackshaft 506 via the gear units (512-1, 512-2, 512-3, and 512-4) comprising respective Power Take-Off (PTO) belts (514-1, 514-2, 514-3, and 514-4). In this regard, the gear units (512-1, 512-2, 512-3, and 512-4) can comprise a gear mechanism (e.g. but not limited to a bevel gear type mechanism) that can be configured to cause rotation of the jackshaft 506 about Z axis to be translated into rotation of each of the drive rollers (218-1, 218-2, 218-3, and 218-4) about respective axis (P1, P2, P3, and P4). In accordance with said example embodiments, as the drive rollers (218-1, 218-2, 218-3, and 218-4) rotates, the idler rollers (220-1, 220-2, 220-3, and 220-4) supports rotation of the drive rollers thereby causing the tubes (208-1, 208-2, 208-3, and 208-4) to rotate in a direction opposite to direction of rotation of the drive rollers (218-1, 218-2, 218-3, and 218-4).

In some example embodiments, rotation of the tubes (208-1, 208-2, 208-3, and 208-4) may be such that, each tube can be configured to rotate at a rotational speed different from each other, depending on factors like, physical characteristic of items to be passed through the respective chutes (200-1, 200-2, 200-3, and 200-4), a rate of inflow of items through the respective inlets (202-1, 202-2, 202-3, and 202-4), and a rate of outflow of items through the respective outlets (204-1, 204-2, 204-3, and 204-4). Alternatively, in some example embodiments, each tube from amongst the tubes (208-1, 208-2, 208-3, and 208-4) can be configured to rotate at a same rotational speed.

Figure 7:
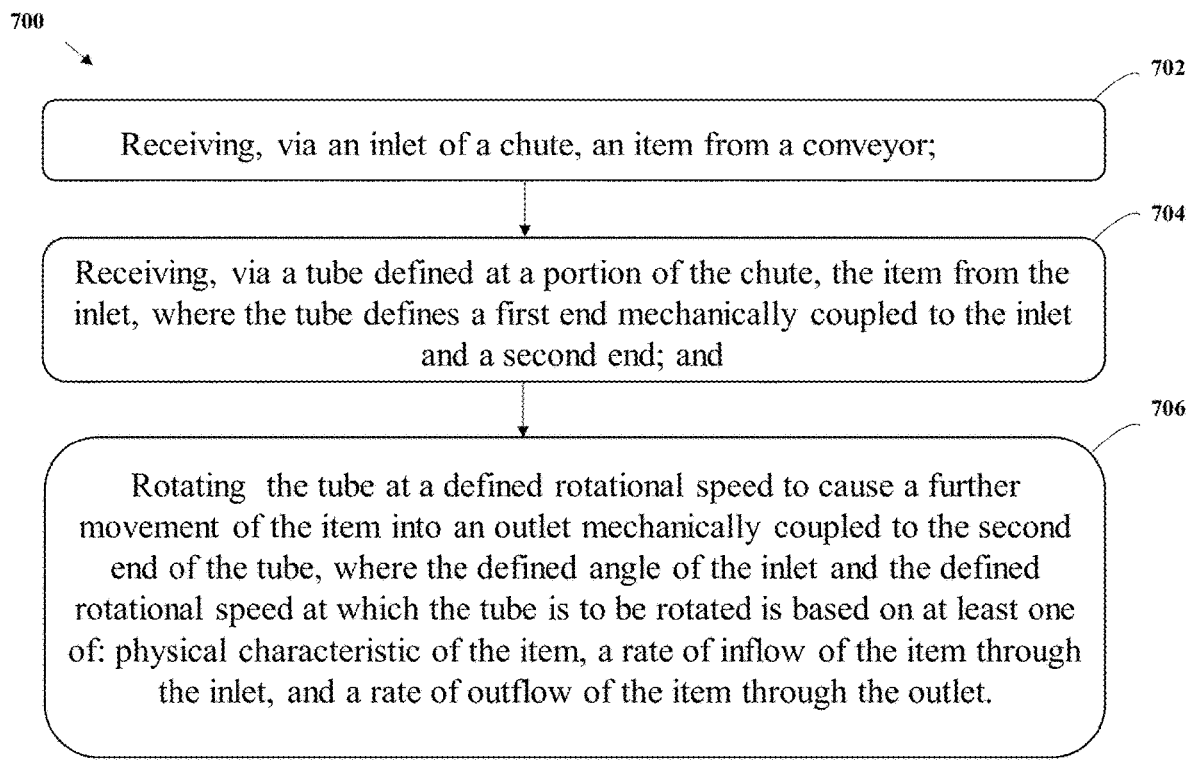
FIG. 7 illustrates a flowchart representing a method for collecting items in the material handling system, in accordance with some example embodiments described herein.

FIG. 7 illustrates an example flowchart representing a method for collecting items, via the chute 200 of the material handling system 100, as described in FIGS. 1-6, in accordance with various embodiments described herein. It will be understood that each or some blocks of the flowcharts, and combinations of blocks in the flowcharts, may be implemented by various means, such as hardware, firmware, one or more processors, circuitry and/or other devices associated with execution of software including one or more computer program instructions, and/or in conjunction with operations of various mechanical components like tube 208, inlet 202, outlet 204, and/or the like as described in FIGS. 1-6. For example, some blocks of one or more of the procedure described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 7 when executed, convert a computer or processing circuitry into a particular machine configured to perform an example embodiment of the present invention. In some examples, the operations of FIG. 7 can define an algorithm for configuring a computer or processor, to perform some blocks of the method described hereinafter, in accordance with some example embodiments. In some cases, a general-purpose computer may be provided with an instance of the processor which performs the algorithm of FIG. 7 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 7 illustrates an example flowchart representing a method for collecting items, via the chute 200 of the material handling system 100, in accordance with some example embodiments described herein. According to various example embodiments, the method 700 for collecting items may start at step 702. At step 702, the material handling system 100 can include means such as, the chute 200 for receiving the flow of items 402 from the conveyor 102, 212. In this regard, at step 702, the inlet 202 of the chute 200, may receive at an item of the flow of items 402 from the conveyor 212. As described earlier, the inlet 202 of the chute 200 can be positioned at a defined angle Y with respect to the conveyor 212 that ensures falling off the item from the surface 210 of the conveyor 212 towards the chute 200 due to gravitational and/or centrifugal forces acting on the item as it is diverted towards the chute 200. The item herein, may correspond to an item from the flow of items 402 diverted towards the chute 200 from the conveyor 102, 212. According to said example embodiments, the flow of items 402 including the item may be received onto the inlet 202 at a defined flow rate (e.g., but not limited to, 3 items per second or 5 items per minute, and/or the like). In this regard, as the item falls onto the inlet 202 from the conveyor 102, 212, the item may gain speed due to gravitational pull experienced by the item. Moving to step 704, the tube 208 defined at the tube portion 206 of the chute 200 may further receive the item from the inlet 202. In this regard, the tube 208 may be rotating at a defined rotational speed while it receives the item from the inlet 202. In this regard, in accordance with some example embodiments, as the tube 208 rotates and the flow of items 402 is inflowed into the tube 208, various items in the flow of items 402 may move along a helical path along with the rotating tube 208, thereby causing the items in the flow of the items 402 to continuously move towards the outlet 204 without experiencing any jam.

According to some example embodiments described herein, the tube 208 of the chute 200 can be positioned at angle which can be much flatter as necessary to facilitate overcoming static friction which the items experiences from surface of the tube 208. In this regard, in accordance with various example embodiments described herein, as the tube 208 rotates at a selected or desired rotational speed, the items entering from the inlet 202 will begin climbing a wall defined by lateral surface of the tube 208 as depicted in FIG. 4. Further, as the items begin climbing the wall of the tube 208, the items will reach a height where the static friction can be overcome and the items start sliding back down from the wall of the tube 208. To this extent, as the angle Y at which the chute 200 is installed relative to the conveyor 212 is below horizontal by some degree, the items will also index forward through the tube 208. Furthermore, as tube 208 is continually rotating, a process of items climbing against the wall and sliding forward will repeat until the item reaches the outlet 204. Any subsequent flow of items entering the chute 200 will follow a same process.

Moving to step 706, the material handling system 100 can include means such as the control unit 130 that can cause, via the actuation unit, rotation of the tube 208 at a defined rotational speed, to cause a further movement of the item into the outlet 204. The outlet 204 can be mechanically coupled to the distal end 220 of the tube 208. Further, in accordance with said example embodiments, the defined angle Y of the inlet 202 and the defined rotational speed at which the tube 208 is to be rotated is based on at least one of: physical characteristic of the item, a rate of inflow of the item through the inlet 202, and a rate of outflow of the item through the outlet 204. Thus, by way of implementation of the said method, the flow of items 402 diverted towards the chute 200 may move down through the chute 200 at a constant flow rate and can be safely collected into the accumulator without being damaged. Further, as the flow of items 402 move through the chute 200, the items may not be jammed or piled up over each other which may disrupt continuity in the operation of the material handling system 100.

In some example embodiments, the control unit 130 via the actuation unit, may also cause manipulation of the rotational speed at which the tube 208 rotates. Said differently, the control unit 130 may cause the tube 208 to rotate at varying rotational speed within a defined range based on factors like, but not limited to, physical characteristic of item to be passed through the chute 200, a rate of inflow of the item through the inlet 202, and a rate of outflow of the item through the outlet 204.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A material handling system comprising:
   a conveyor;
   an actuation unit; and
   a chute mechanically coupled to the conveyor at a defined angle with respect to a surface of the conveyor, the chute comprising:
     an inlet defining a first end and a second end, where the first end of the inlet is mechanically coupled to the surface of the conveyor;
     at least one tube defining a proximal end and a distal end, wherein the proximal end of the tube is mechanically coupled to the second end of the inlet, wherein the at least one tube is configured to be rotated about a central axis of the tube by the actuation unit at a defined rotational speed; and
     an outlet mechanically coupled to the distal end of the at least one tube, wherein the defined angle at which the chute is mechanically coupled to the conveyor and the defined rotational speed at which the at least one tube is configured to rotate about the central axis of the tube are based on at least one of physical characteristic of an item to be passed through the chute, a rate of inflow of the item through the inlet, and a rate of outflow of an item through the outlet.

2. The material handling system of claim 1, wherein the actuation unit comprises:
   at least one drive roller; and
   at least one idler roller, wherein the at least one drive roller and the at least one idler roller are configured to rotate in a first direction cause rotation of the at least one tube in a second direction opposite to the first direction.

3. The material handling system of claim 2, wherein the at least one tube is positioned between the at least one drive roller and the at least one idler roller and wherein the at least one tube abuts with a surface of the at least one drive roller and a surface of the at least one idler roller so that the rotation of the at least one drive roller and the at least one idler roller causes rotation of the at least one tube.

4. The material handling system of claim 1, wherein the at least one tube is configured to rotate at a variable rotational speed within a defined range of rotational speed.

5. The material handling system of claim 1, wherein the physical characteristic of the item is associated with at least one of a size of the item, a dimension of the item, a weight of the item, a material of the item, and a type associated with the item.

6. The material handling system of claim 1, wherein the conveyor is one of a loop sorter (tilt-tray or cross-belt), a bomb-bay sorter, a shoe sorter, a singulation conveyor, or a line sorter.

7. The material handling system of claim 2, comprising a plurality of chutes, wherein each chute is mechanically coupled to the conveyor and comprises a respective tube.

8. The material handling system of claim 7, wherein the actuation unit comprises a shaft assembly mechanically coupled to the at least one drive roller and at least one idler roller and the rotation of the at least one drive roller and the at least one idler roller causes the shaft assembly to rotate a tube corresponding to each chute of the plurality of chutes.

9. The material handling system of claim 4, further comprising a control unit configured to:
   determine at least one of:
     the physical characteristic of the item to be passed through the chute, the rate of inflow of the item through the inlet, and the rate of outflow of the item through the outlet; and
   based on the determining, manipulate, via the actuation unit, the rotational speed of the at least one tube.

10. A chute of a material handling system comprising:
    an inlet of the chute configured to interface with a surface of a conveyor at a defined angle with respect to the surface;
    an outlet of the chute configured to interface with an item accumulator; and
    a tube portion of the chute between the inlet and the outlet, wherein the tube portion is configured to be rotated about a central axis of the tube portion at a defined rotational speed by an actuation motor, wherein the defined angle at which the inlet is configured to interface with the surface of the conveyor and the defined rotational speed at which the at least tube portion is configured to be rotated about the central axis of the tube portion are based on at least one of a physical characteristic of an item to be passed through the chute, a rate of inflow of the item through the inlet, and a rate of outflow of the item through the outlet.

11. The chute of claim 10, wherein the tube portion is configured to be rotated at a variable rotational speed within a defined range of rotational speed.

12. The chute of claim 10, wherein the rotational speed of the tube portion is based on at least one of a physical characteristic of the item to be passed through the chute, a rate of inflow of the item through the inlet, and a rate of outflow of the item through the outlet.

13. The chute of claim 11, wherein the inlet comprises a first end defining a tapered surface mechanically coupled to the conveyor and configured to receive a flow of items from the conveyor and a second end defining a curved surface defining a curvature that matches a lateral surface defining a proximal end of the tube portion to facilitate movement of flow of the item from the inlet into the tube portion.

14. The chute of claim 13, wherein the outlet comprises a first portion defining a curved surface defining a curvature that matches to a lateral surface defining a distal end of the tube portion to facilitate the movement of the flow of the item from the tube portion to the outlet.

15. The chute of claim 10, wherein the inlet of the chute is mechanically coupled to one of a loop sorter (tilt-tray or cross-belt), a bomb-bay sorter, a shoe sorter, a singulation conveyor, or a line sorter.

16. A method of collecting items in a material handling environment, the method comprising:
receiving, via an inlet of a chute, an item from a conveyor, wherein the inlet of the chute is positioned at a defined angle with respect to the conveyor;
receiving, via a tube defined at a portion of the chute, the item from the inlet, wherein the tube defines a first end mechanically coupled to the inlet and a second end; and
rotating the tube about a central axis of the tube at a defined rotational speed, to cause a further movement of the item into an outlet mechanically coupled to the second end of the tube, wherein the defined angle of the inlet and the defined rotational speed at which the tube is to be rotated about the central axis of the tube is based on at least one of a physical characteristic of the item, a rate of inflow of the item through the inlet, and a rate of outflow of the item through the outlet.

17. The method of claim 16, wherein the method further comprises positioning the chute at a defined angle relative to the conveyor, wherein the conveyor is at least one of a loop sorter (tilt-tray or cross-belt), a bomb bay sorter, a shoe sorter, a singulation conveyor, or a line sorter.

18. The method of claim 16, wherein the method further comprises configuring the tube to rotate at variable rotational speed within a defined range of rotational speed based on at least one of a physical characteristic of the item, a rate of inflow of the item through the inlet, and a rate of outflow of the item through the outlet.

19. The method of claim 16, further comprising:
rotating a drive roller and an idler roller, at a defined rotational speed in a first direction to cause rotation of the tube in a second direction opposite to the first direction.

20. The method of claim 16, wherein the method further comprises mechanically coupling the chute to the conveyor, wherein the conveyor is one of a loop sorter (tilt-tray or cross-belt), a bomb-bay sorter, a shoe sorter, a singulation conveyor, or a line sorter.

* * * * *